United States Patent [19]

Okuno et al.

[11] Patent Number: 5,521,027
[45] Date of Patent: May 28, 1996

[54] NON-AQUEOUS SECONDARY ELECTROCHEMICAL BATTERY

[75] Inventors: Hiromi Okuno, Osaka; Hizuru Koshina, Neyagawa; Akiyoshi Morita, Takaishi, all of Japan

[73] Assignee: Matsushita Electric Industrial Co., Ltd., Osaka, Japan

[21] Appl. No.: 60,252

[22] Filed: May 12, 1993

Related U.S. Application Data

[63] Continuation-in-part of Ser. No. 692,594, Apr. 29, 1991, abandoned.

[30] Foreign Application Priority Data

Oct. 25, 1990 [JP] Japan .................... 2-289150
Nov. 5, 1990 [JP] Japan .................... 2-300765

[51] Int. Cl.$^6$ .................................. H01M 10/40
[52] U.S. Cl. .................. 429/194; 429/197; 429/199; 429/218; 429/221; 429/223; 429/224
[58] Field of Search .................. 429/194, 197, 429/218, 199, 221, 223, 224

[56] References Cited

U.S. PATENT DOCUMENTS

| | | | |
|---|---|---|---|
| 3,873,369 | 3/1975 | Kamenski | 136/83 |
| 3,945,848 | 3/1976 | Dey et al. | 1.36/100 |
| 4,056,663 | 11/1977 | Schlaikjer | 429/197 |
| 4,198,476 | 4/1980 | Di Salvo, Jr. et al. | 429/194 |
| 4,357,215 | 11/1982 | Goodenough et al. | |
| 4,423,125 | 12/1983 | Basu . | |
| 4,463,071 | 7/1984 | Gifford et al. | 429/194 |
| 4,497,726 | 2/1985 | Brule et al. | 252/183.1 |
| 4,702,977 | 10/1987 | Hiratsuka et al. | 429/194 |
| 4,751,160 | 6/1988 | Plichta et al. . | |
| 4,804,596 | 2/1989 | Ebner et al. . | |
| 4,957,833 | 8/1990 | Daifuku et al. | 429/197 |
| 5,153,082 | 10/1992 | Ogino et al. | 429/194 |

FOREIGN PATENT DOCUMENTS

| | | |
|---|---|---|
| 0364626 | 12/1988 | European Pat. Off. . |
| 2316757 | 5/1976 | France . |
| 63-1212610 | 5/1988 | Japan . |
| 2-148665 | 6/1990 | Japan . |

OTHER PUBLICATIONS

M. Stanley Whittingham, The Role of Ternary Phases in Cathode Reactions, *J. Electrochem Soc.*, vol. 123, No. 3, pp. 215–320, Mar., 1976.

J. R. Dahn, Rechargeable LiNiO$_2$/Carbon Cells, *J. Electrochem. Soc.*, vol. 138, No. 8, Aug. 1991.

*Primary Examiner*—M. Nuzzolillo
*Attorney, Agent, or Firm*—Ratner & Prestia

[57] ABSTRACT

A non-aqueous secondary electrochemical battery which includes a complex oxide containing lithium for a cathode, carbon for an anode, and a mixed solvent for an electrolyte is disclosed. The mixed solvent is obtained by dissolving an inorganic salt in a mixture of a cyclic ester and an asymmetric chain carbonate. The cyclic ester is selected from the group consisting of ethylene carbonate, propylene carbonate, butylene carbonate and γ-butyrolactone. The asymmetric chain carbonate is selected from the group consisting of ethylmethyl carbonate, methylpropyl carbonate and ethylpropyl carbonate. In this way, a non-aqueous secondary electrochemical battery having an improved cycle life capability, discharge performance, and low temperature performance can be obtained.

8 Claims, 4 Drawing Sheets

NON-AQUEOUS SECONDARY ELECTROCHEMICAL BATTERY

The present invention is a continuation-in-part application of U.S. Ser. No. 07/692,594 filed on Apr. 29, 1991, now abandoned.

BACKGROUND OF THE INVENTION

1. Field of the Invention

The present invention relates to a non-aqueous secondary electrochemical battery comprising a complex oxide containing lithium for a cathode and carbon for an anode, and more particularly, to a non-aqueous secondary electrochemical battery having improved cycle life capabilities, discharge performance, and low temperature performance.

2. Description of the Related Art

Recently, various kinds of portable or cordless electronic equipment have been developed one after another, and as a power source for driving these equipments, the demand for small-sized and lightweight secondary batteries which have high energy density has increased. In this respect, because of their high voltage and high energy density, non-aqueous secondary lithium batteries have been desired.

As for secondary batteries, nickel-cadmium batteries and lead acid batteries having excellent performance capabilities are commercially available. Therefore, when non-aqueous electrochemical batteries are used as secondary batteries, it is desired that cathode active materials for these batteries have high energy density, that is, high capacity and high potential.

As a cathode active material, a complex oxide containing lithium is well known. For example, U.S. Pat. No. 4,357,215 discloses a battery comprising $LiCoO_2$ as an active material for a cathode.

On the other hand, U.S. Pat. No. 4,423,125 discloses a non-aqueous electrochemical battery which comprises carbon for an anode instead of lithium metals or lithium alloys. Since this battery uses carbon capable of intercalating and deintercalating lithium ions, it exhibits safety and good cycle life capability.

Moreover, Japanese Laid-Open Patent Publication No. 63-121260 discloses a combination of these electrodes, in which $LiCoO_2$ and carbon are used for a cathode and an anode, respectively.

When carbon such as graphite is used for an anode, it is required that a complex oxide containing lithium, e.g., $LiCoO_2$, is used as a cathode and as a lithium source. Since a lithium metal is not used for the anode, active dendritic products, that is, so-called dendrites are not produced on the surface of the anode during the charge, while on the other hand dendrites are produced when a lithium metal is used for an anode. As a result, the cathode and anode are kept free from the penetration of the dendrites through a separator, which would otherwise cause a short circuit therebetween. The battery can be prevented from igniting or exploding. In this way, the secondary battery which is safe and excellent in discharge-charge cycle life capabilities can be obtained. However, the discharge-charge cycles involve a decomposition of a solvent of a non-aqueous electrolyte as a side reaction, and repetition of the cycles gradually deteriorates the characteristics of the battery.

When a lithium metal is used for an anode, after repetition of the charge-discharge cycles, dendrites are produced on a surface of the anode during the charge not only to cause a short circuit but also to react with a non-aqueous solvent to partially decompose the solvent during the charge. As a result, charge efficiency is lowered. In this system, the maximum charge efficiency is approximately in the range of 98 to 99%. When a lithium alloy is used for the anode, although the dendrites are not produced, the non-aqueous electrolyte is decomposed on the surface of the alloy during the charge. As a result, the maximum charge efficiency is said to be approximately 99%.

When the carbon is used for the anode, lithium, an active material, is intercalated between layers of the carbon. Therefore, the decomposition of a solvent on the surface of the anode as mentioned above should not be caused. However, the charge efficiency of 100% can not actually be attained.

It is assumed by the inventors that the reason for the above-mentioned side reaction with the carbon anode is as follows:

When carbon is used for the anode, lithium ions and a solvent are co-intercalated between the carbon layers. At that time decomposition of the solvent sometimes occurs. That is, the solvent whose molecular diameter is large can not be intercalated between the layers, so that the solvent is partially decomposed at the entrance of the carbon layers.

Examples of a solvent for an electrolyte of the above-mentioned lithium battery preferably include esters such as propylene carbonate and ethylene carbonate. U.S. Pat. No. 4,804,596 also discloses that an ester-based electrolyte is preferably used when $LiCoO_2$, one of the lithium containing oxides, is used for a cathode.

One of the requirements for a solvent suitable for a lithium battery is a high dielectric constant, that is, a capability of dissolving a large amount of inorganic salt which is a solute. The above-mentioned propylene carbonate and ethylene carbonate satisfy this requirement. However, these esters have cyclic structures and large molecular diameters. Therefore, when a lithium ion and a solvent are co-intercalated between the carbon layers, this type of solvent is partially decomposed during the charge as described above.

On the contrary, solvents having a chain structure such as chain esters are readily intercalated between the carbon layers because of their structure. However, dimethylformamide and acetonitrile, which are known to have a high dielectric constant for dissolving a large amount of an inorganic salt, are highly reactive to lithium. Therefore, it is difficult to use them practically although they are easily intercalated between the layers. Among the chain esters, diethyl carbonate and ethyl acetate are not reactive to lithium and easily intercalated between the carbon layers, but they have a low dielectric constant, so that they are unable to dissolve a large amount of an inorganic salt.

To solve the above-mentioned problems, the inventors of the present invention discovered a use of a mixed solvent containing a cyclic ester and a chain ester as a solvent for an electrolyte, whereby a large amount of an inorganic salt is dissolved and a lithium ion with a chain ester is readily intercalated and deintercalated between the layers of the carbon without the decomposition of the solvent.

Further, it is found in this application that among the chain esters, an asymmetric chain carbonate provides particularly excellent characteristics of a battery.

Japanese Laid-Open Patent Publication No. 2-148665 already discloses the use of an asymmetric chain carbonate as a solvent suitable for an electrolyte of a lithium secondary battery having another electrode system. According to the present invention, however, a mixture of an asymmetric chain carbonate and a cyclic ester used for a carbon anode provides a specific effect.

More specifically, there is a specific correlation between the carbon for the anode and the cyclic ester to be mixed with the asymmetric chain carbonate. When graphites such as an artificial graphite, natural graphite or a mesocarbon microbead having been heat-treated at a high temperature of 2000° C. or more having a lattice spacing (d002) of 3.40 angstroms or less, which can be measured by a wide angle X-ray diffraction method of carbon, are used, ethylene carbonate with a relatively small molecular diameter is useful. When carbon having been heat-treated at a temperature of 1500° C. or less and slightly graphitizable carbon and the like, which are amorphous carbon having a large d002 of 3.40 angstroms or more, are used, propylene carbonate, γ-butyrolactone, butylene carbonate and the like are useful.

SUMMARY OF THE INVENTION

The non-aqueous secondary electrochemical battery according to the present invention comprises a complex oxide containing lithium of the formula $Li_{1-x}MO_2$, wherein $0 \leq x < 1$, for a cathode, carbon capable of intercalating and deintercalating a Li ion for an anode, and a non-aqueous electrolyte. The non-aqueous electrolyte is obtained by dissolving an inorganic salt in a mixed solvent containing a cyclic ester and an asymmetric chain carbonate represented by the general formula ROCOOR', wherein R≠R', and R and R' are independently an alkyl group having 1 to 4 carbon atoms.

In another aspect of the present invention, the non-aqueous secondary electrochemical battery comprises $Li_{1-x}CoO_2$ wherein $0 \leq x < 1$, or $Li_{1-x}CoO_2$ wherein 50% or less in the molar ratio of Co is replaced with another kind of a transition metal for a cathode, carbon for an anode, and a non-aqueous electrolyte. The non-aqueous electrolyte is obtained by dissolving at least one inorganic salt selected from the group consisting of lithium tetrafluoroborate, lithium hexafluorophosphate, and lithium perchlorate in a mixed solvent containing ethylene carbonate and ethylmethyl carbonate.

Thus, the invention described herein makes possible the advantages of (1) providing a non-aqueous secondary electrochemical battery which can prevent the electrolyte from decomposing by using a mixed solvent of a cyclic ester and an asymmetric chain carbonate as a solvent for the electrolyte; (2) providing a non-aqueous secondary electrochemical battery having improved discharge performance and low temperature performance; and (3) providing a non-aqueous secondary electrochemical battery having improved cycle life capabilities.

These and other advantages of the present invention will become apparent to those skilled in the art upon reading and understanding the following detailed description with reference to the accompanying figures.

DESCRIPTION OF THE PREFERRED EMBODIMENTS

Figure 1:
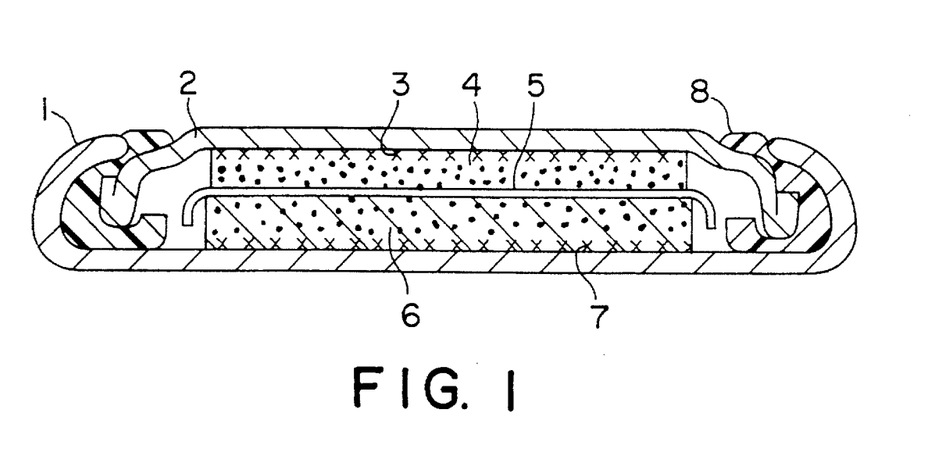
FIG. 1 is a cross-sectional view showing a typical structure of a coin-shaped battery according to the present invention.

FIG. 1 shows a typical structure of a coin-shaped non-aqueous secondary battery of the present invention, A battery case 1 and a sealing plate 2 are both made of stainless steel. An anode collector 3 is made of a nickel grid and attached to an inner surface of the sealing plate 2 by spot welding, An anode 4 is formed by molding an active material mainly containing carbon and is pressed onto the anode collector 3 of a nickel grid. A separator 5 is a micro-porous film formed from a polyolefin type resin having a void structure (a sponge structure) such as polypropylene, polyethylene or copolymers thereof. A cathode 6 is formed by molding a mixed agent containing a lithium-cobalt complex oxide ($LiCoO_2$) as its main active material and is pressed onto grid 7 made of titanium. After the cathode 6 and the anode 4 are impregnated with electrolytes, they are coupled through the separator 5 and sealed with gaskets 8 made of polypropylene.

EXAMPLE 1

First, ethylene carbonate (hereinafter, referred to as "EC") which is a cyclic ester, and diethyl carbonate (hereinafter, referred to as "DEC") which is a chain ester, were mixed in the following volumetric ratios to obtain solvents for electrolytes. Then, coin-shaped batteries were manufactured by using the solvents thus obtained and mesocarbon microbeads having been heat-treated at 2800° C. as carbon for an anode. Since the melting point of EC is 36.4° C. and it solidifies at around 20° C., that is, the test temperature, the battery using EC alone as a solvent for an electrolyte was not manufactured. As a solute for the electrolyte, lithium perchlorate was used so that the concentration thereof was 1 mol/l. However the concentration of the solute for the electrolyte using DEC alone was selected as 0.5 mol/l, since DEC does not sufficiently dissolve the solute.

Battery A: EC:DEC=0:100
Battery B: EC:DEC=10:90
Battery C: EC:DEC=20:80
Battery D: EC:DEC=30:70
Battery E: EC:DEC=50:50
Battery F: EC:DEC=70:30
Battery G: EC:DEC=90:10

The discharge-charge cycles were repeated 100 times under the conditions that voltages for stopping charge and discharge were 4.2 V and 3.0 V, respectively, at a constant current of 1 mA. The test was performed at 20° C., and then the electrolyte was cooled to −20° C. and allowed to stand at that temperature to judge the discharge abilities of those batteries at −20° C. The results are shown in FIGS. 2 and 3 and Table 1 below.

Figure 2:
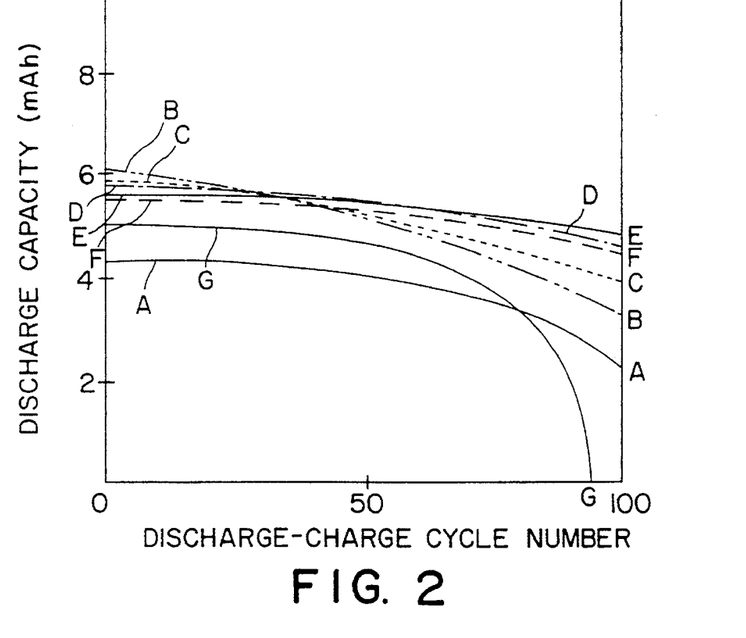
FIG. 2 is a graph showing the discharge capacity of a battery used in Example 1 against a discharge and charge cycle number.

As shown in FIG. 2, the discharge performance deteriorates in the order of E, D, F, C, B, G and A. When the chain ester or the cyclic ester was used alone or used as a dominant component, the discharge capacity was low. In the battery A, the degradation of the capacity was low, but the absolute value of the capacity was the lowest. In the battery G, the average discharge voltage was substantially lowered with the repetition of the discharge-charge cycles, which appeared to be responsible for the decrease of the capacity.

Figure 3:
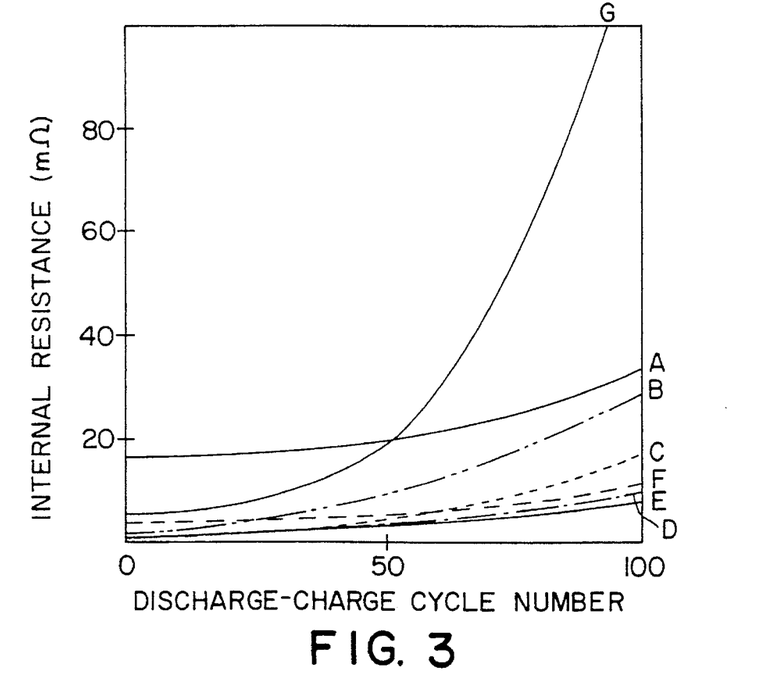
FIG. 3 is a graph showing a post-charging internal resistance of the battery used in Example 1 against a discharge and charge cycle number.

FIG. 3 shows a post-charging internal resistance after charging at 20° C. against a number of the discharge-charge cycles.

As is apparent from FIG. 3, in the battery G containing 90% of the cyclic ester, the post-charging internal resistance was substantially increased with the repetition of the discharge-charge cycles, which appeared to be responsible for the decrease of the capacity. In the batteries A through F, however, the post-charged internal resistance was not markedly increased. Such a change in the internal resistance seems to be responsible for the capacity characteristics of the battery as shown in FIG. 2.

From the above results, it is noted that when the chain ester is used alone, the resultant battery can not attain excellent characteristics. This is because the resistivity of the electrolyte is high and the polarization of the battery is large due to the low ability of the chain ester for dissolving the solute, resulting in a small capacity of the battery. Moreover, when the cyclic ester is used as a dominant component, the solvent is decomposed on the anode plate during the charge. Then, the resistance of the plate is increased since the decomposed products are accumulated thereon and the discharge-charge reaction occurs in a limited part of the plate due to the lack of an electrolyte, resulting in the decrease of the capacity. These disadvantages are overcome by mixing the chain ester in electrolyte.

Table 1 shows the states of electrolytes A to G when they were allowed to stand at −20° C. for one hour. In the tables described hereinafter, the same reference marks as those of the batteries are used. At −20° C., the electrolytes F and G were solidified, and a solute is partially deposited in the electrolyte A. Accordingly, in order to obtain a battery which can operate at −20° C., the mixing ratio of the solvents, i.e., DEC/EC, was preferably in the range of 1 to 9. In view of the internal resistance and discharge capacity, the mixing ratio is preferably in the range of 1 to 4.

TABLE 1

| Electrolyte | A | B | C | D | E | F | G |
| --- | --- | --- | --- | --- | --- | --- | --- |
| DEC/EC volume ratio | 100/0 | 90/10 | 80/20 | 70/30 | 50/50 | 30/70 | 10/90 |
| State at −20° C. | Liquid (a solute is partially deposited) | Liquid | Liquid | Liquid | Liquid | solid | solid |

EXAMPLE 2

The same test as Example 1 was conducted except that lithium hexafluorophosphate was used as a solute for an electrolyte, and similar results to those obtained in Example 1 were obtained. The change in the capacity and the internal resistance caused by the repetition of the discharge-charge cycles deteriorate in the order of E, D, F, C, B, G and A. However, as a whole, the capacity was larger and the internal resistance was lower than those found in Example 1, where lithium perchlorate was used. It appeared that this phenomenon was due to a difference in the resistivity of the electrolytes, for the electrical conductivity of lithium hexafluorophosphate is higher than lithium perchlorate.

Table 2 shows the states of the electrolytes A to G when they were allowed to stand at −20° C. for one hour. Since the solubility of lithium hexafluorophosphate was smaller than lithium perchlorate in DEC, solutes were partially deposited in the electrolytes A and B. That is, when the lithium hexafluorophosphate is used, a mixing ratio (DEC/EC) is preferably in the range of 1 to 4.

TABLE 2

| Electrolyte | A | B | C | D | E | F | G |
| --- | --- | --- | --- | --- | --- | --- | --- |
| DEC/EC volume ratio | 100/0 | 90/10 | 80/20 | 70/30 | 50/50 | 30/70 | 10/90 |
| State at −20° C. | Liquid (a solute is partially deposited) | Liquid (a solute is partially deposited) | Liquid | Liquid | Liquid | solid | solid |

EXAMPLE 3

The same test as Examples 1 and 2 was conducted except that DEC was replaced with ethylmethyl carbonate (hereinafter referred to as "EMC") which is an asymmetric chain carbonate and that lithium hexafluorophosphate was used as the inorganic salt solute. The results are shown in FIGS. 4 and 5 and Table 3.

Figure 4:
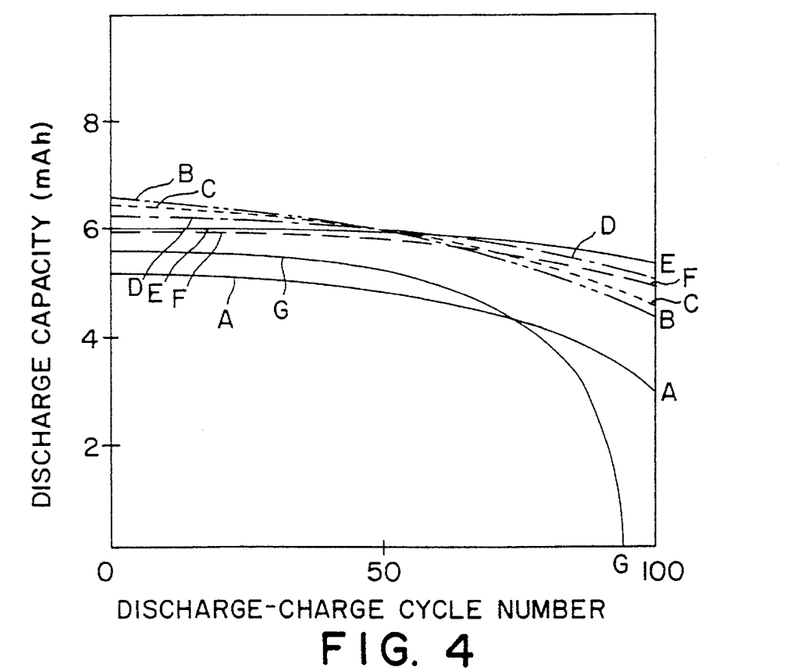
FIG. 4 is a graph showing the discharge capacity of a battery used in Example 3 against a discharge and charge cycle number.

As is apparent from FIG. 4, the capacity deteriorates in the order of E, D, F, C, B, G and A similarly to Example 1. However, as a whole, the capacity was larger than those found in Example 1. It appears to be that this is due to a difference in the resistivity of the electrolyte, for the conductivity of the electrolyte using EMC is higher compared with that of the electrolyte using DEC.

Figure 5:
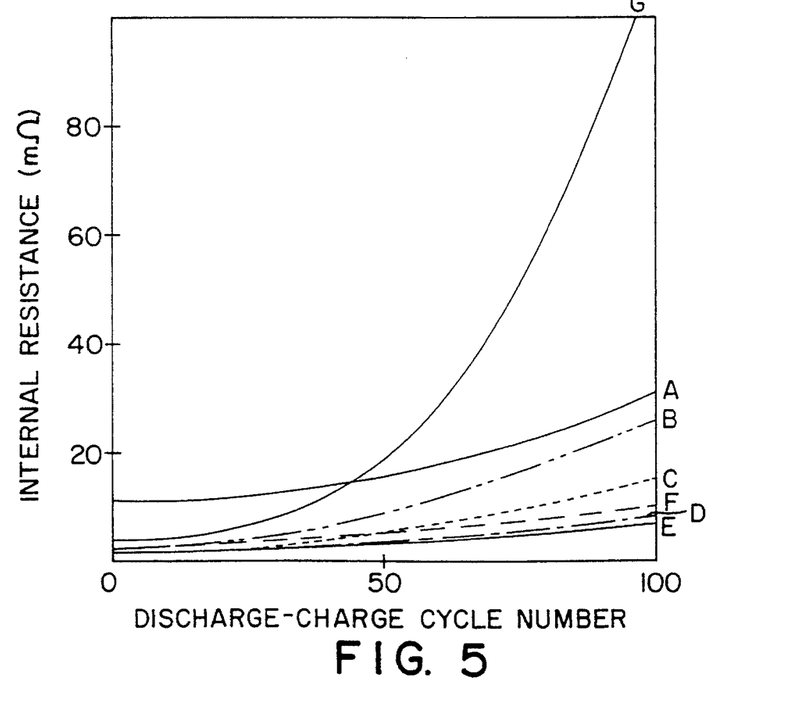
FIG. 5 is a graph showing a post-charging internal resistance of the battery used in Example 3 against a discharge and charge cycle number.

Also in FIG. 5, which shows the change in the internal resistivity in response to the repetition of the discharge-charge cycles, similar results to those obtained in Example 1 were obtained. The battery with a higher degradation of capacity has a larger internal resistivity. As a whole, the batteries including EMC has rather small internal resistivity. This also appears to be due to a difference in the resistivity in the electrolyte caused by a higher conductivity of the electrolyte using EMC.

Table 3 shows the states of the electrolytes A to G when they were allowed to stand at −20° C. for one hour. At −20° C., the electrolyte B, which was solidified in a case where DEC was used, was not solidified with EMC. This appears to be because EMC has a higher dielectric constant and lower coagulation point, that is, EMC is more excellent in the capability of dissolving the solute. Accordingly, in order to obtain a battery which can operate at −20° C., the volumetric mixing ratio of the solvents, i.e., EMC/EC, was preferably in the range of 1 to 9, when lithium hexalfluorophosphate was used in the solvent.

TABLE 3

| Electrolyte | A | B | C | D | E | F | G |
| --- | --- | --- | --- | --- | --- | --- | --- |
| EMC/EC volume ratio | 100/0 | 90/10 | 80/20 | 70/30 | 50/50 | 30/70 | 10/90 |
| State at −20° C. | Liquid (a solute is partially deposited) | Liquid | Liquid | Liquid | Liquid | solid | solid |

EXAMPLE 4

Seven kinds of coin-shaped batteries were manufactured by using lithium hexafluorophosphate, which was found to have relatively good characteristics in Examples 1 and 2, as the inorganic salt as a solute, petroleum coke having been heat-treated at 1300° C. as carbon for an anode, propylene carbonate (hereinafter referred to as "PC"), which is a cyclic ester as a solvent in an electrolyte, and DEC which is a chain ester in the electrolyte. Respective batteries had the same volumetric ratios of the solvent and solute densities as in Example 2. The coin-shaped batteries were determined for their cycle life characteristics under the same conditions as in Example 2. As a result, the capacity and the internal resistivity in response to the discharge-charge cycles at 20° C. deteriorate in the order of E, D, F, C, B, G and A similarly to Example 2 where EC was used. The batteries using EC exhibited relatively better characteristics, having a larger discharge capacity and a longer cycle life. This appears to be because the electrolyte using EC has a higher conductivity, resulting in a small resistivity of the electrolyte and a small polarization of the battery. Therefore, such a battery has a larger capacity. The reaction is caused uniformly on a plate, thereby decreasing the deterioration due to the repetition of the discharge-charge cycles.

Table 4 shows the states of the electrolytes A to G when they were allowed to stand at −20° C. for one hour. Since PC has a lower coagulation point than EC, the electrolyte was a liquid in all the electrolytes.

TABLE 4

| Electrolyte | A | B | C | D | E | F | G |
| --- | --- | --- | --- | --- | --- | --- | --- |
| DEC/PC volume ratio | 100/0 | 90/10 | 80/20 | 70/30 | 50/50 | 30/70 | 10/90 |
| State at −20° C. | Liquid | Liquid | Liquid | Liquid | Liquid | Liquid | Liquid |

EXAMPLE 5

The same test as Example 4 was conducted except that DEC was replaced with EMC. The capacity and the internal resistivity in response to the discharge-charge cycles at 20° C. deteriorate in the order of E, D, F, C, B, G and A similarly to Example 3 where EC was used. The batteries according to this example exhibited comparatively good characteristics, having a larger discharge capacity and a longer cycle life than those according to Example 4 using DEC. This also applies to those using EC as a cyclic ester for an electrolyte. This appears to be because the electrolyte using EMC has a higher conductivity, resulting in a small resistivity of the electrolyte and a small polarization of the battery. Therefore, such a battery has a larger capacity. The reaction is caused uniformly on a plate, thereby decreasing the deterioration due to the repetition of the discharge-charge cycles.

As is obvious from the above-mentioned results, a mixture of the cyclic ester and the chain ester can improve the cycle life characteristics of a non-aqueous battery regardless of the kinds of the solute to be used. Especially, the use of the asymmetric chain carbonate as the chain ester was found to provide a remarkable effect.

Table 5 shows the states of the electrolytes A to G when they were allowed to stand at −20° C. for one hour. Since PC has a lower coagulation point than EC, the electrolytes were liquids in all the batteries.

TABLE 5

| Electrolyte | A | B | C | D | E | F | G |
|---|---|---|---|---|---|---|---|
| EMC/EC volume ratio | 100/0 | 90/10 | 80/20 | 70/30 | 50/50 | 30/70 | 10/90 |
| State at −20° C. | Liquid | Liquid | Liquid | Liquid | Liquid | Liquid | Liquid |

EXAMPLE 6

A low temperature test was conducted with respect to the compositions of the electrolytes which had been found to be liquids in the low temperature standing tests in Examples 2 and 3 by using mesocarbon microbeads having been heat-treated at 2800° C. as carbon for an anode, DEC or EMC as the chain ester, and lithium hexafluorophosphate having a concentration of 1 mol/l as the solute in the electrolyte. The electrolytes with the following volumetric ratios were tested:

Battery A: EC:DEC=20:80
Battery B: EC:DEC=30:70
Battery C: EC:DEC=50:50
Battery D: EC:EMC=20:80
Battery E: EC:EMC=30:70
Battery F: EC:EMC=50:50

The discharge-charge cycles were repeated 10 times under the conditions that voltages for stopping charge and discharge were 4.2 V and 3.0 V, respectively, at a constant current of 1 mA. The discharge-charge cycles were repeated 10 times at 20° C., and then the charged batteries were cooled to −20° C. and discharged. The magnitudes of the discharge capacities of batteries were compared. The results are shown in FIG. 6.

Figure 6:
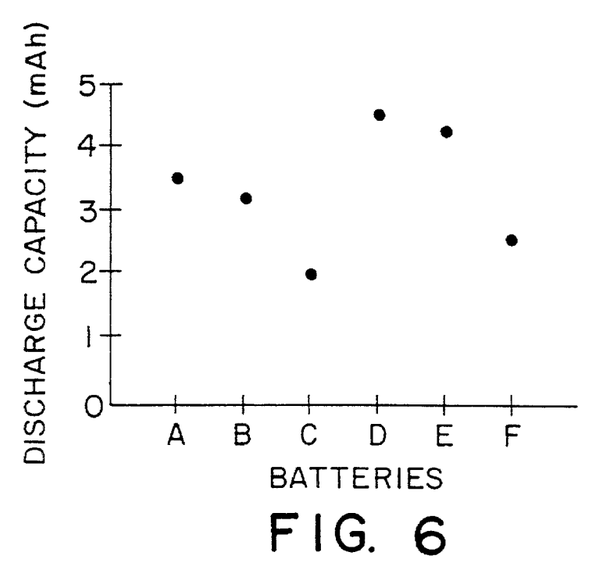
FIG. 6 is a graph showing the discharge capacity of a battery of Example 6 at −20° C. after 10 cycles of charge-discharge at 20° C.

FIG. 6 shows a discharge capacity of each of the above described batteries at −20° C.

The discharge capacity deteriorates in the order of D, E, A, B, F and C. As a whole, the batteries including EMC have rather small internal resistivity and good characteristics at a low temperature than those including DEC. This appears to be because those including EMC have higher conductivity at a low temperature. In addition, the smaller the mixing ratio of EC with a higher viscosity is, the larger the discharge capacity of the resultant battery is. Namely, a battery including an electrolyte with a smaller resistivity has a larger discharge capacity.

EXAMPLE 7

The same low temperature test as in Example 6 was conducted with respect to the compositions of the electrolytes which had been found to be liquids in the low temperature standing tests in Examples 4 and 5 except that petroleum coke having been heat-treated at 1300° C. was used as carbon for an anode. As a solute, lithium hexafluorophosphate was used at a concentration of 1 mol/l in each electrolyte. The electrolytes with the following volumetric ratios were tested:

Battery A: PC:DEC=10:90
Battery B: PC:DEC=20:80
Battery C: PC:DEC=30:70
Battery D: PC:DEC=50:50
Battery E: PC:DEC=70:30
Battery F: PC:EMC=10:90
Battery G: PC:EMC=20:80
Battery H: PC:EMC=30:70
Battery I: PC:EMC=50:50
Battery J: PC:EMC=70:30

The test conditions were identical to those in Example 6. The results are shown in FIG. 7.

Figure 7:
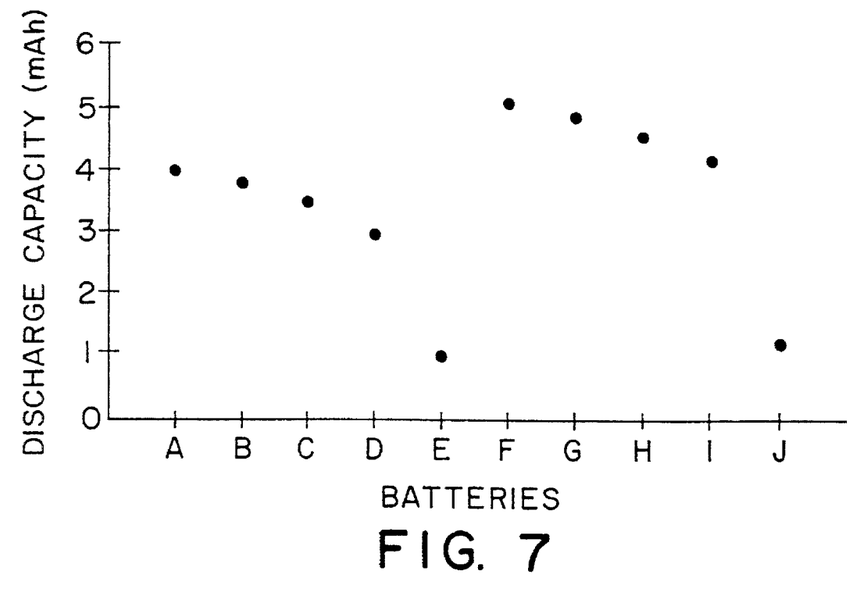
FIG. 7 is a graph showing the discharge capacity of a battery of Example 7 at −20° C. after 10 cycles of charge-discharge at 20° C.

FIG. 7 shows the discharge capacity of each of the above described batteries at −20° C.

The discharge capacity deteriorates in the order of F, G, H, I, A, B, C, D, J and E. The batteries including PC have a larger capacity than those of Example 6 including EC. This appears to be because those including EC have a higher viscosity at a low temperature. In addition, the smaller the mixing ratio of PC having a higher viscosity than DEC or EMC is, the larger the discharge capacity is. Especially, the batteries E and J including a large amount of PC are regarded as having a smaller discharge capacity due to the high resistivity of the electrolyte at a low temperature.

As is obvious from the results of Examples 6 and 7, a battery using an asymmetric chain carbonate as the chain ester can provide efficient characteristics at a low temperature.

The foregoing results revealed the following: According to the present invention, a non-aqueous electrolyte including a mixed solvent of a cyclic ester and asymmetric carbonate exhibits excellent characteristics. Particularly, for obtaining a non-aqueous battery with satisfactory cycle life characteristics and low temperature performance, a volumetric mixed ratio of the asymmetric carbonate to the cyclic ester should be 1 to 9 or less, preferably 1 to 4 or less.

When artificial graphite, natural graphite or a mesocarbon microbead having been heat-treated at a high temperature of 2000° C. or more is used as carbon, a combination with ethylene carbonate as the cyclic ester is useful. When amorphous carbon such as carbon having been heat-treated at a temperature of 1500° C. or less or non-graphitized carbon is used as the carbon, a combination with propylene carbonate as the cyclic ester is useful.

In the examples, the lithium-cobalt complex oxide represented by the general formula $Li_{1-x}CoO_2$ was used for a cathode active material. However, compounds containing lithium represented by the general formulas $Li_{1-x}NiO_2$, $Li_{1-x}FeO_2$ and $Li_{1-x}Mn_2O_4$ (wherein $0 \leq x < 1$), or those represented by the above formulas wherein 50% or less in the molar ratio of Co, Ni, Fe or Mn is replaced by another kind of transition metal such as $LiCo_{0.7}Ni_{0.3}O_2$, can also be used.

Moreover, as a cyclic ester, that is, a component of a solvent for an electrolyte, propylene carbonate or ethylene carbonate was used in the examples. However, other cyclic esters such as butylene carbonate, γ-butyrolactone, or a mixture thereof can be used. As an asymmetric chain carbonate, ethylmethyl carbonate was used in the examples. However, other asymmetric chain carbonates represented by the general formula ROCOOR', wherein R≠R', and R and R' are independently alkyl having 1 to 4 carbon atoms. Examples of such an asymmetric chain carbonate include propylmethyl carbonate, propylethyl carbonate, and a mixture thereof. As a solute for an electrolyte, lithium perchlorate and lithium hexafluorophosphate were used in the examples. However, other inorganic salts such as lithium hexafluorarsenate, lithium trifluoromethanesulfonate, lithium tetrafluoroborate, or a mixture thereof can be used.

Moreover, a coin-shaped battery was used as a battery to be tested in the examples. However, the above-mentioned effects can be attain in a larger battery, for example, a cylindrical battery.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A non-aqueous secondary electrochemical battery comprising a complex oxide containing lithium of the formula $Li_{1-x}MO_2$, wherein $0 \leq x < 1$, for a cathode, where M is a transition metal selected from the group consisting of Co, Ni, Fe, and Mn or a plurality of transition metals including one selected from the group consisting of Co, Ni, Fe, and Mn, carbon capable of intercalating and deintercalating a Li ion for an anode, and a non-aqueous electrolyte, wherein said non-aqueous electrolyte is obtained by dissolving an inorganic salt in a mixed solvent consisting of cyclic ester selected from the group consisting of ethylene carbonate, propylene carbonate, butylene carbonate, and γ-butyrolactone, and an asymmetric chain carbonate selected from the group consisting of ethylmethyl carbonate, methylpropyl carbonate, and ethylpropyl carbonate, and wherein the ratio of said asymmetric chain carbonate to said cyclic ester is in the range of 1:1 to 9:1 by volume.

2. A non-aqueous secondary electrochemical battery according to claim 1, wherein said inorganic salt is at least one selected from the group consisting of lithium tetrafluoroborate, lithium hexafluorophosphate, lithium hexafluoroarsenate, lithium trifluoromethanesulfonate, and lithium perchlorate.

3. A non-aqueous secondary electrochemical battery according to claim 1, wherein said complex oxide containing lithium is at least one represented by the general formula $Li_{1-x}CoO_2$, $Li_{1-x}NiO_2$, $Li_{1-x}FeO_2$ or $Li_{1-x}Mn_2O_4$, wherein $0 \leq x < 1$.

4. A non-aqueous secondary electrochemical battery according to claim 3, wherein said complex oxide containing lithium is at least one represented by the general formula $Li_{1-x}CoO_2$, $Li_{1-x}NiO_2$, $Li_{1-x}FeO_2$ or $Li_{1-x}Mn_2O_4$, wherein $0 \leq x < 1$, and 50% or less in the molar ratio of Co, Ni, Fe or Mn is replaced with another kind of a transition metal.

5. A non-aqueous secondary electrochemical battery comprising $Li_{1-x}CoO_2$ wherein $0 \leq x < 1$ or $Li_{1-x}CoO_2$ wherein $0 \leq x < 1$ and 50% or less, on a molar basis, of Co is replaced with a transition metal selected from the group consisting of Ni, Fe, and Mn, for a cathode, carbon capable of intercalating and deintercalating a Li ion for an anode, and a non-aqueous electrolyte, wherein said non-aqueous electrolyte is obtained by dissolving at least one inorganic salt selected from the group consisting of lithium tetrafluoroborate, lithium hexafluorophosphate, lithium hexafluoroarsenate, lithium trifluoromethanesulfonate, and lithium perchlorate in a mixed solvent consisting of ethylene carbonate or propylene carbonate and ethylmethyl carbonate, wherein the ratio of said ethylmethyl carbonate to said ethylene carbonate or propylene carbonate is in the range of 1:1 to 9:1 by volume.

6. A non-aqueous secondary electrochemical battery according to claim 5, wherein the ratio of said ethylmethyl carbonate to said ethylene carbonate or propylene carbonate is in the range of 1:1 to 4:1 by volume, and said lithium hexafluorophosphate is dissolved as a solute in said mixed solvent.

7. A non-aqueous secondary electrochemical battery comprising $Li_{1-x}CoO_2$, wherein $0 \leq x < 1$, for a cathode, carbon capable of intercalating and deintercalating a Li ion for an anode, and a non-aqueous electrolyte, wherein said non-aqueous electrolyte is obtained by dissolving at least one inorganic salt selected from the group consisting of lithium tetrafluoroborate, lithium hexafluorophosphate, lithium hexafluoroarsenate, lithium trifuluoromethanesulfonate and lithium perchlorate in a mixed solvent consisting of ethylene carbonate or propylene carbonate and ethylmethyl carbonate, wherein the ratio of said ethylmethyl carbonate to said ethylene carbonate or propylene carbonate is in the range of 1:1 to 9:1 by volume.

8. A non-aqueous secondary electrochemical battery according to claim 7, wherein the ratio of said ethylmethyl carbonate to said ethylene carbonate or propylene carbonate is in the range of 1:1 to 4:1 by volume, and said lithium hexafluorophosphate is dissolved as a solute in said mixed solvent.

\* \* \* \* \*

UNITED STATES PATENT AND TRADEMARK OFFICE
CERTIFICATE OF CORRECTION

PATENT NO. : 5,521,027
DATED : May 28, 1996
INVENTOR(S) : Okuno et al.

It is certified that error appears in the above-indentified patent and that said Letters Patent is hereby corrected as shown below:

Column 4, line 19, "invention, A" should be --invention.  A--.

Signed and Sealed this

Thirty-first Day of December, 1996

*Attest:*

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,521,027
DATED : May 28, 1996
INVENTOR(S) : Okuno et al.

It is certified that error appears in the above-indentified patent and that said Letters Patent is hereby corrected as shown below:

On the Cover Page, field [56] FOREIGN PATENT DOCUMENTS, "63-1212610" should read --63-121260--.

Signed and Sealed this

Eleventh Day of March, 1997

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,521,027
DATED : May 28, 1996
INVENTOR(S) : Okuno et al.

It is certified that error appears in the above-indentified patent and that said Letters Patent is hereby corrected as shown below:

On the Cover Page, field [56] OTHER PUBLICATIONS, cited pages under the Whittingham reference "215-320" should read --315-320--.

Signed and Sealed this

Tenth Day of June, 1997

Attest:

BRUCE LEHMAN

Attesting Officer      Commissioner of Patents and Trademarks